United States Patent
Hargraves et al.

(10) Patent No.: US 11,506,243 B2
(45) Date of Patent: *Nov. 22, 2022

(54) TEMPERATURE-ROBUST POLYMER SHROUD FOR ROLLER BEARING SEAL

(71) Applicant: Amsted Rail Company, Inc., Chicago, IL (US)

(72) Inventors: James Hargraves, Petersburg, VA (US); Michael A. Mason, Petersburg, VA (US)

(*) Notice: Subject to any disclaimer, the term of this patent is extended or adjusted under 35 U.S.C. 154(b) by 146 days.

This patent is subject to a terminal disclaimer.

(21) Appl. No.: 16/925,219

(22) Filed: Jul. 9, 2020

(65) Prior Publication Data
US 2020/0340719 A1  Oct. 29, 2020

Related U.S. Application Data

(63) Continuation of application No. 15/791,186, filed on Oct. 23, 2017, now Pat. No. 10,746,228.

(51) Int. Cl.
*F16C 33/78* (2006.01)
*F16C 19/38* (2006.01)
(Continued)

(52) U.S. Cl.
CPC ..... *F16C 33/7823* (2013.01); *B60H 1/00278* (2013.01); *B60H 1/00342* (2013.01);
(Continued)

(58) Field of Classification Search
CPC .. F16C 33/7823; F16C 19/386; F16C 43/045; F16C 35/042; F16C 33/805;
(Continued)

(56) References Cited

U.S. PATENT DOCUMENTS 199,505 A * 1/1878 Britton ...................... B62B 9/12
296/73
4,792,242 A * 12/1988 Colanzi ............... F16C 33/7859
384/480
(Continued)

FOREIGN PATENT DOCUMENTS

EA 201101166 A1 7/2012
JP 2003049832 A 2/2003
(Continued)

OTHER PUBLICATIONS

Australian Patent Application No. 2018355177 first Examination Report dated Aug. 13, 2020, 6 pages.
(Continued)

*Primary Examiner* — Eugene G Byrd
(74) *Attorney, Agent, or Firm* — Lathrop GPM LLP

(57) ABSTRACT

A temperature-robust polymer shroud for a roller bearing seal includes a shroud body and an inner diameter leg defining respective portions of a single continuous part. The shroud body encircles a rotation axis of the polymer shroud and extends predominantly in directions orthogonal to the rotation axis from an inner diameter to an outer diameter. The inner diameter leg connects to the shroud body at the inner diameter and encircles the rotation axis, wherein, along the entire inner diameter of the shroud body, the inner diameter leg is oriented at an oblique angle to the rotation axis to extend both (a) radially inward from the inner diameter and (b) axially away from the inner diameter along a first direction parallel to the rotation axis. A roller bearing seal includes a seal case, an elastomer lip, and the temperature-robust polymer shroud.

17 Claims, 8 Drawing Sheets

(51) Int. Cl.
  *F16C 43/04* (2006.01)
  *F16C 33/80* (2006.01)
  *F16C 35/04* (2006.01)
  *B60H 1/32* (2006.01)
  *B60H 1/00* (2006.01)
  *F25B 30/02* (2006.01)
  *F25D 17/02* (2006.01)
  *F28D 9/00* (2006.01)

(52) U.S. Cl.
  CPC ..... *B60H 1/00385* (2013.01); *B60H 1/00885* (2013.01); *B60H 1/00921* (2013.01); *B60H 1/32284* (2019.05); *F16C 19/38* (2013.01); *F16C 33/7826* (2013.01); *F16C 33/7886* (2013.01); *F16C 33/805* (2013.01); *F16C 35/042* (2013.01); *F16C 43/045* (2013.01); *F25B 30/02* (2013.01); *B60H 1/004* (2013.01); *B60H 1/00428* (2013.01); *B60H 1/00899* (2013.01); *B60H 2001/00307* (2013.01); *B60H 2001/00928* (2013.01); *B60H 2001/00949* (2013.01); *F16C 19/386* (2013.01); *F16C 33/7813* (2013.01); *F16C 2208/10* (2013.01); *F16C 2326/10* (2013.01); *F25D 17/02* (2013.01); *F28D 9/0093* (2013.01)

(58) Field of Classification Search
  CPC .............. F16C 33/7886; F16C 33/7826; F16C 2326/10; F16C 2208/10; F16C 33/7813; F16C 19/38; F28D 9/0093; F25D 17/02; B60H 2001/00949; B60H 2001/00928; B60H 2001/00307; B60H 1/00899; B60H 1/00428; B60H 1/004; B60H 1/00921; B60H 1/00885; B60H 1/00385; B60H 1/00342; B60H 1/00278; B60H 1/32284; F25B 30/02
  See application file for complete search history.

(56) References Cited

U.S. PATENT DOCUMENTS

| | | | |
|---|---|---|---|
| 5,419,642 A | 5/1995 | McLarty | |
| 5,487,611 A | 1/1996 | Dreschmann et al. | |
| 6,561,559 B1 | 5/2003 | Skiller | |
| 7,258,491 B2 | 8/2007 | Gutowski et al. | |
| 8,061,901 B2 | 11/2011 | Hosmer | |
| 8,864,385 B2 | 10/2014 | Varnoux et al. | |
| 9,157,475 B2 | 10/2015 | Gutowski et al. | |
| 2003/0001341 A1* | 1/2003 | Sakata ............... | F16J 15/348 277/423 |
| 2003/0156772 A1 | 8/2003 | Yamashita et al. | |
| 2005/0259901 A1* | 11/2005 | Vignotto ............. | F16C 41/007 384/448 |
| 2007/0000008 A1* | 1/2007 | Sawicki ............. | A41D 13/0025 2/69 |
| 2008/0031556 A1* | 2/2008 | Heim ................. | G01P 3/443 301/105.1 |
| 2008/0226212 A1* | 9/2008 | Mason ............... | F16C 33/7813 384/480 |
| 2011/0000011 A1* | 1/2011 | Gebka ............... | G09F 15/00 4/321 |
| 2011/0193294 A1* | 8/2011 | Munekata ........... | F16J 15/3264 277/423 |
| 2013/0287329 A1* | 10/2013 | Varnoux ............. | F16C 33/76 384/485 |
| 2014/0000010 A1* | 1/2014 | Geary ................ | A41F 1/00 2/336 |
| 2015/0000010 A1* | 1/2015 | Boos ................. | A41F 1/002 2/259 |
| 2015/0337902 A1* | 11/2015 | Shimizu ............. | F16C 33/667 29/898.062 |
| 2015/0377299 A1* | 12/2015 | Varnoux ............. | F16C 33/7866 384/479 |
| 2016/0061266 A1 | 3/2016 | Baart et al. | |
| 2016/0076596 A1* | 3/2016 | Baracca ............. | F16C 33/7823 384/480 |
| 2016/0108962 A1* | 4/2016 | Miyazaki ........... | F16C 33/7846 384/473 |
| 2016/0363169 A1* | 12/2016 | Tahara ............... | F16C 33/7863 |
| 2018/0355918 A1* | 12/2018 | Hargraves .......... | F16J 15/4478 |

FOREIGN PATENT DOCUMENTS

| | | |
|---|---|---|
| JP | 2006010027 A | 1/2006 |
| JP | 2011185326 A | 9/2011 |
| JP | 2016142364 A | 8/2016 |
| RU | 2378542 C2 | 1/2010 |
| RU | 2518789 C2 | 6/2014 |

OTHER PUBLICATIONS

PCT/US2018/056933 International Search Report and Written Opinion dated Jan. 28, 2019, 8 pages.
U.S. Appl. No. 15/791,186 Non-Final Office Action dated Aug. 8, 2019, 9 pages.
U.S. Appl. No. 15/791,186 Notice of Allowance dated Apr. 7, 2020, 7 pages.
Swedish Patent Application No. 2050592-1 Office Action dated Jan. 15, 2021, 10 pages.
Russian Patent Application No. 2020116819 Office Action dated Jan. 12, 2021, with English translation, 16 pages.

* cited by examiner

TEMPERATURE-ROBUST POLYMER SHROUD FOR ROLLER BEARING SEAL

CROSS-REFERENCE TO RELATED APPLICATIONS

The present application is a continuation of U.S. patent application Ser. No. 15/791,186, filed Oct. 23, 2017, which is incorporated herein by reference in its entirety.

BACKGROUND

Demand for lower freight transportation cost is driving up the average freight car weight around the world. To carry heavier weight, the freight cars must be equipped with strong bearings capable of carrying both axial and radial loads.

Tapered roller bearings efficiently carry both axial and radial loads. A tapered roller bearing includes one or more rows of tapered rollers. Each row encircles the rotation axis of the bearing. Each tapered roller has the shape of a truncated cone. This geometry allows the tapered roller bearing to support axial loads (loads parallel to the rotation axis of the bearing). A popular choice for freight cars is the double-row tapered roller bearing which has two rows of tapered rollers. The two rows are tapered in opposite directions to locate the shaft, or journal, in both directions along the rotation axis.

Tapered roller bearings, as well as other types of roller bearings, operate with a lubricant within the bearing to reduce friction between the rollers and the raceways on which the rollers roll. To contain the lubricant within the bearing and to prevent water, dirt, and other contaminants from entering the bearing, the bearing is sealed. The seal may be a contact seal that forms a physical barrier between the inside of the bearing and the external environment. Common contact seals include a rubber ring that seals a gap between a rotating and non-rotating portion of the roller bearing.

SUMMARY

In an embodiment, a roller bearing seal includes a seal case, an elastomer lip, and a polymer shroud. The elastomer lip is attached to the inner diameter edge of the seal case to complete a seal between the seal case and a wear ring while permitting rotation of the seal case and the rubber lip about the wear ring. The polymer shroud wraps partially around a non-bearing side of the seal case and shrouds the seal. The polymer shroud includes an inner diameter leg configured to attach the polymer shroud to the wear ring with the inner diameter leg at an oblique angle to the wear ring.

In an embodiment, a polymer shroud for a roller bearing seal includes a shroud body and an inner diameter leg being respective portions of a single continuous part. The shroud body encircles a rotation axis of the polymer shroud and extends predominantly in directions orthogonal to the rotation axis from an inner diameter to an outer diameter. The inner diameter leg connects to the shroud body at the inner diameter, encircles the rotation axis, and is oriented at an oblique angle to the rotation axis to extend both (a) radially inward from the inner diameter and (b) axially away from the inner diameter along a first direction parallel to the rotation axis.

In an embodiment, a method of assembling a roller bearing seal includes positioning a polymer shroud to wrap partially around a non-bearing side of a seal case, and interference fitting an inner diameter leg of the polymer shroud onto a wear ring encircled by the seal case, the inner diameter leg being oriented at an oblique angle to its rotation axis to extend both (a) radially outward from the wear ring and (b) axially away from inner diameter of the inner diameter leg along a first direction parallel to the rotation axis.

DETAILED DESCRIPTION OF THE EMBODIMENTS

Figure 1:
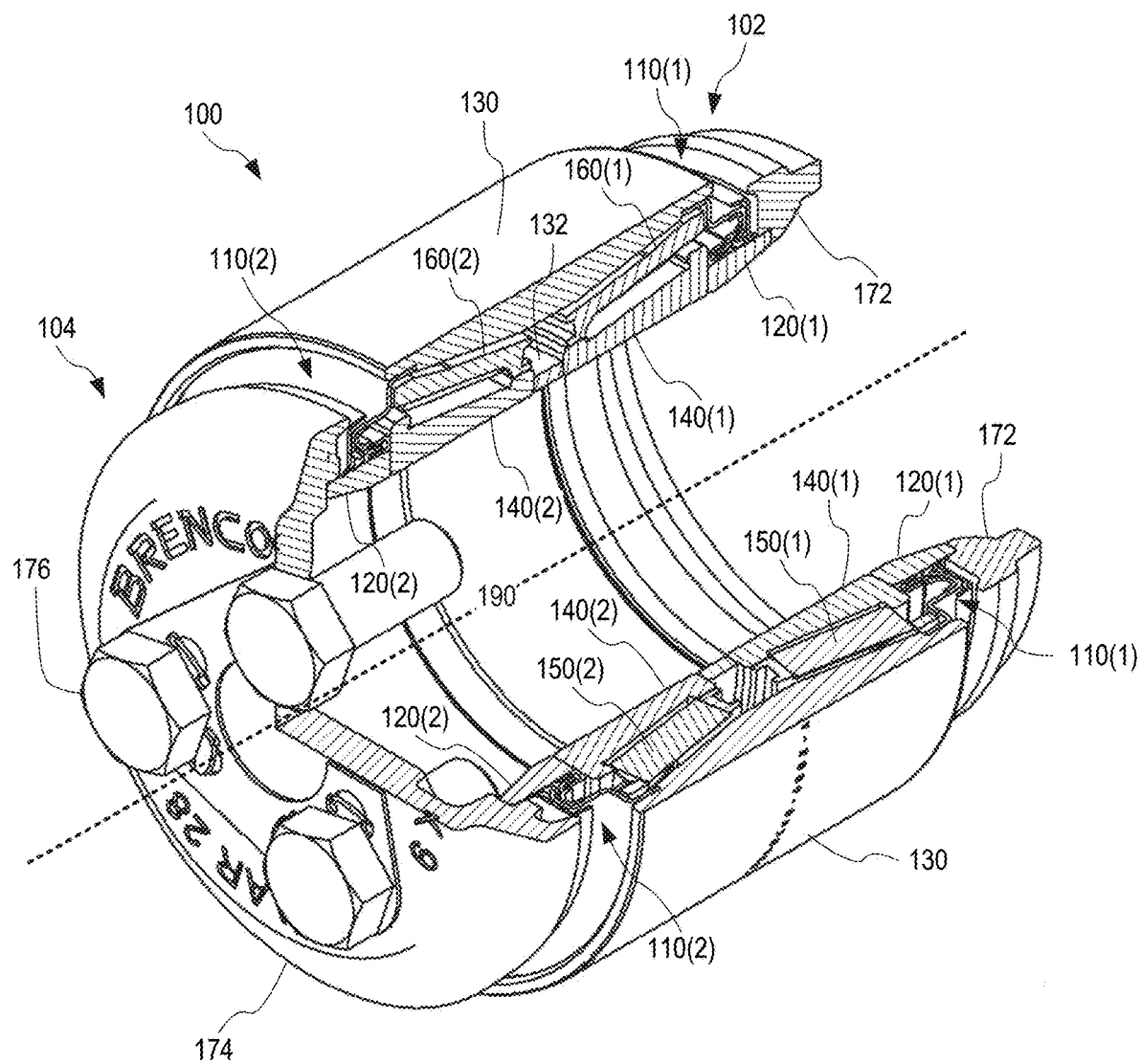
FIGS. 1 and 2 illustrate a roller bearing seal in an exemplary implementation, according to an embodiment.
Figure 2:
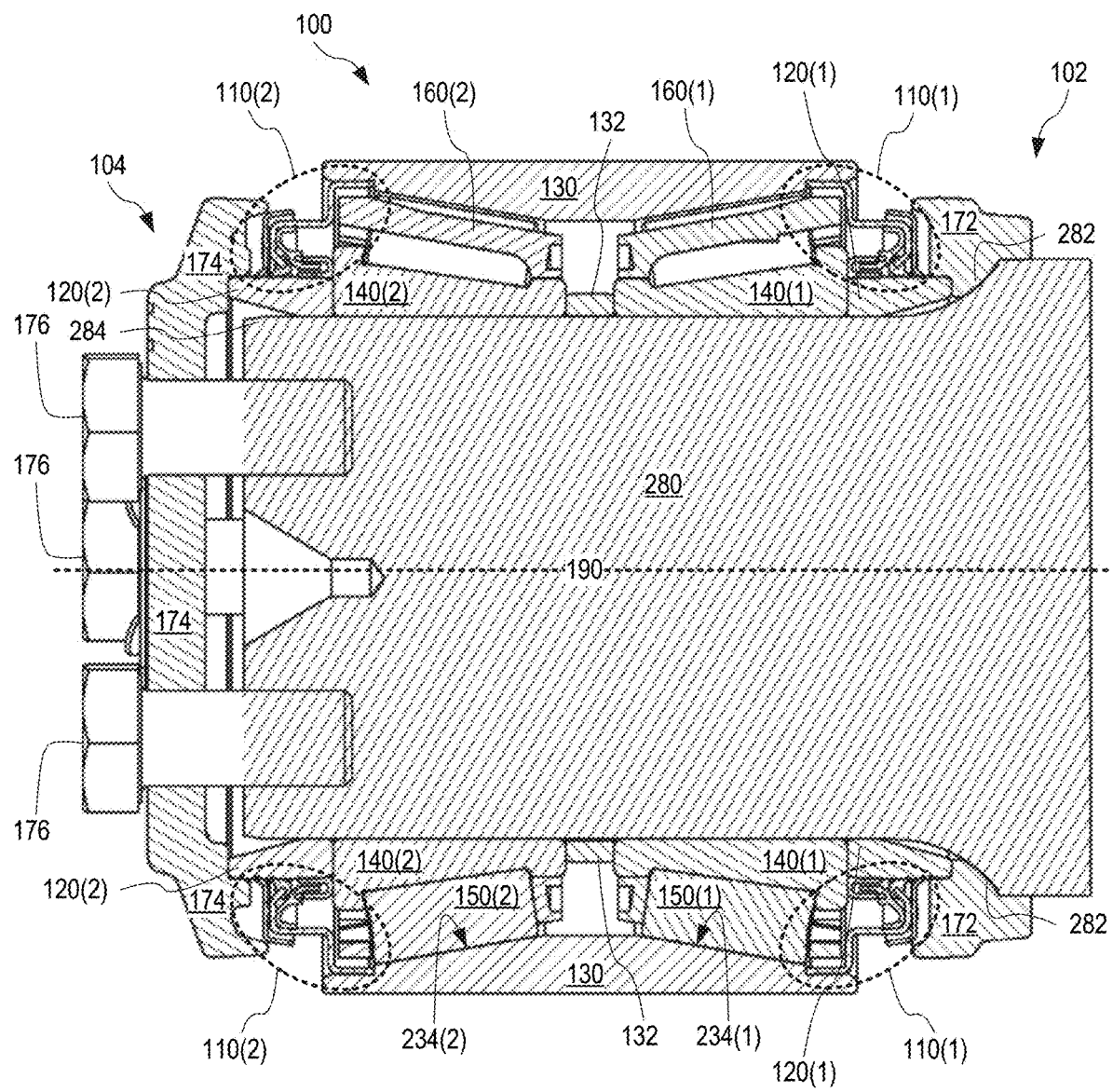

FIGS. 1 and 2 illustrate a roller bearing seal 110 in an exemplary implementation, wherein two instances of roller bearing seal 110 are used to seal a roller bearing 100. In the implementation depicted in FIGS. 1 and 2, roller bearing 100 is mounted on a journal 280 of an axle, such as a rail car axle or a truck axle. FIG. 1 shows a roller bearing 100 in perspective view with a cut-away section to reveal inner parts. For clarity of illustration, journal 280 is omitted in FIG. 1. FIG. 2 shows a full section view of roller bearing 100 mounted on journal 280 with the section being taken along the rotation axis 190 of journal 280. FIGS. 1 and 2 are best viewed together in the following description.

Roller bearing 100 includes two strings of tapered rollers 150: an inboard string of tapered rollers 150(1) near inboard end 102 of journal 280, and an outboard string of tapered rollers 150(2) near outboard end 104 of journal 280. Each tapered roller 150 has the shape of a truncated cone. Tapered rollers 150(1) are tapered in the opposite direction of tapered rollers 150(2). Tapered rollers 150(1) and 150(2) are positioned between a bearing cup 130 and respective bearing cones 140(1) and 140(2). Bearings cones 140 are mounted on journal 280.

Roller bearing seals 110(1) and 110(2) encircle the rotation axis of journal 280 and seal the inboard and outboard sides, respectively, of roller bearing 100. Roller bearing seals are mounted on respective wear rings 120(1) and 120(2) affixed to and encircling journal 280. Wear rings 120 encircle rotation axis 190. Roller bearing 100, roller bearing seals 110, and wear rings 120 cooperate to form a roller bearing assembly that may be mounted on a journal, for example journal 280.

In the embodiment depicted in FIGS. 1 and 2, roller bearing 100 further includes a spacer ring 132 between bearing cones 140(1) and 140(2) to ensure accurate positioning of bearing cones 140(1) and 140(2). Without departing from the scope hereof, bearing cones 140(1) and 140(2) may instead be sized so as to be in direct contact with each other with no need for spacer ring 132; or bearing cones 140(1) and 140(2) may be implemented in a single, integrally formed two-sided bearing cone. As journal 280 rotates relative to bearing cup 130, tapered rollers 150(1) and 150(2) roll on inward facing raceways 234(1) and 234(2) of bearing cup 130.

In an embodiment, roller bearing 100 includes frames 160(1) and 160(2). Tapered rollers 150(1) and 150(2) are seated in seats of respective frames 160(1) and 160(2), and frames 160(1) and 160(2) serve to maintain a desired spacing between tapered rollers 150 of each string.

In the embodiment depicted in FIGS. 1 and 2, journal 280 forms a fillet 282 at its inboard end 102 and terminates in a tapered guide portion 284 at its outboard end 104. Tapered guide portion 284 eases installation of roller bearing 100 onto journal 280. Roller bearing 100 is axially clamped between (a) a backing ring 172 backed up against fillet 282 and (b) a retaining cap 174 affixed to outboard end 104 of journal 280 via bolts (or screws) 176. More specifically, bearing cones 140 are sandwiched between wear rings 120, which in turn are clamped between backing ring 172 and retaining cap 174.

Figure 3:
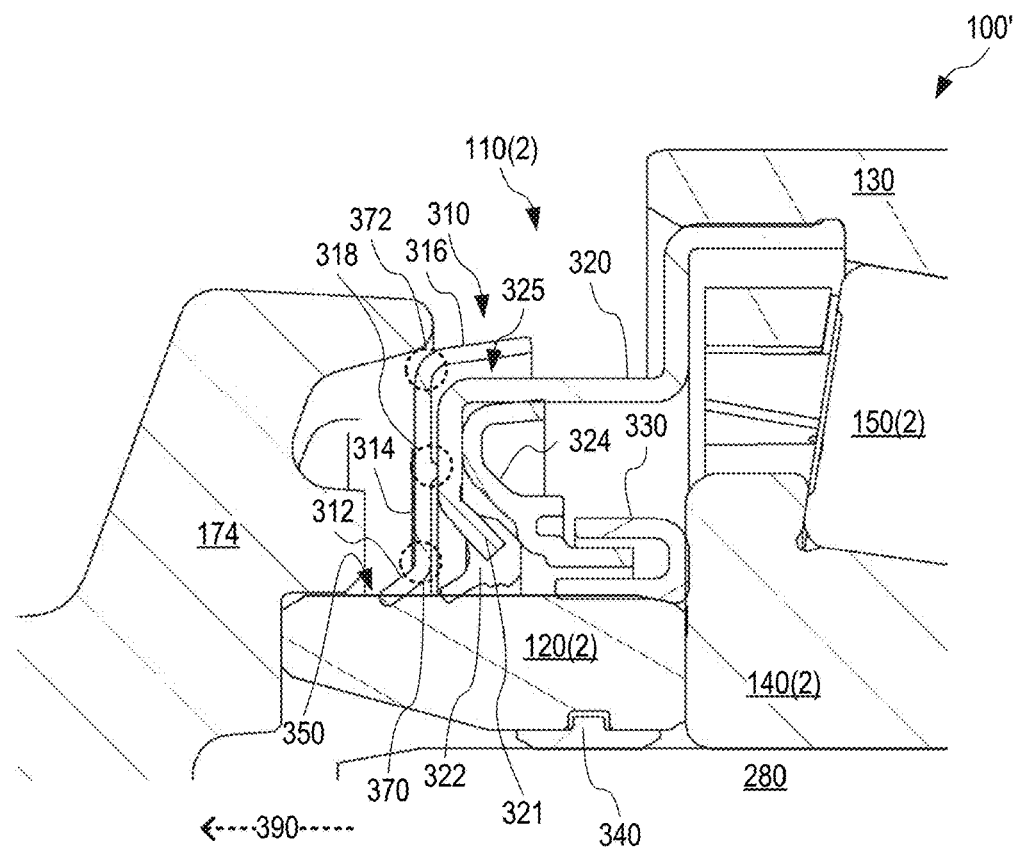
FIG. 3 provides a more detailed view of the roller bearing seal of FIGS. 1 and 2 showing a temperature-robust polymer shroud.

Without departing from the scope hereof, roller bearing 100 may be a different type of roller bearing than shown in FIGS. 1 and 2, such as a single-row tapered roller bearing, a quadruple-row tapered roller bearing, a cylindrical roller bearing, a spherical roller bearing, or a ball bearing. In such alternative embodiments, bearing cup 130, tapered rollers 150, and bearing cones 140 are replaced by suitable components to form the corresponding type of roller bearing; yet these embodiments of roller bearing 100 still include roller bearing seals 110. Likewise, the tapering directions of tapered rollers 150 may be inverted as from what is depicted in FIGS. 1, 2, and 3. Furthermore, while operation of roller bearing 100 typically involves rotation of journal 280 relative to a non-rotating bearing cup 130, the roles may be reversed such that bearing cup 130 rotates about a stationary journal 280, or bearing cup 130 and journal 280 rotate at different speeds.

FIG. 3 provides a more detailed view of roller bearing seal 110 in cross section. In particular, FIG. 3 shows a temperature-robust polymer shroud 310 of roller bearing seal 110. The section 100' depicted in FIG. 3 is equivalent to the upper portion of the full section view of roller bearing seal 110(2) shown in FIG. 2, but applies to roller bearing seal 110(1) as well.

Roller bearing seal 110 includes temperature-robust polymer shroud 310, a seal case 320, an elastomer lip 322, an insert 324, and a rotor 330, each of which encircles rotation axis 190. Seal case 320 is coupled to bearing cup 130. Rotor 330 is mounted on wear ring 120. Temperature-robust polymer shroud 310 is interference fitted on wear ring 120 and wraps partially around the non-bearing side 325 of seal case 320. Non-bearing side 325 of seal case 320 is a side of seal case 320 facing away from roller bearing 100. Elastomer lip 322 is affixed to an inner diameter edge 321 of seal case 320 and seals seal case 320 to a radially outward facing surface 350 of wear ring 120. Insert 324 is mounted in seal case 320 and forms a labyrinth seal with rotor 330. Herein, "inner diameter" of a part encircling rotation axis 190 refers to the perimeter of the part that is closest to rotation axis 190. Similarly, "outer diameter" of a part encircling rotation axis 190 refers to the perimeter of the part that is farthest from rotation axis 190

Temperature-robust polymer 310 is a single continuous part that is composed of a polymer, such as an engineering thermoplastic (such as polyester or a composite material), an ultraviolet-resistant polymer, a thermoset, or an ultraviolet-resistant engineering thermoplastic. Temperature-robust polymer 310 includes an inner diameter leg 312 and a shroud body 314, each encircling rotation axis 190. Shroud body 314 extends predominantly in directions orthogonal to rotation axis 190 from an inner diameter 370 to an outer diameter 372. Inner diameter leg 312 connects to shroud body 314 at inner diameter 370, and is oriented at an oblique angle to rotation axis 190 and radially outward facing surface 350 to extend both (a) radially inward from inner diameter 370 and (b) axially away from inner diameter 370 along a direction 390 parallel to rotation axis 190. In the embodiment shown in FIG. 3, temperature-robust polymer shroud 310 further includes an outer diameter leg 316 that connects to outer diameter 372 of shroud body 314. Herein, "radially inward" refers to a direction toward rotation axis 190, "radially outward" refers to a direction away from rotation axis 190, and an "axial" direction refers to a direction that is substantially parallel to rotation axis 190. Outer diameter leg 316 encircles rotation axis 190 and extends predominantly along rotation axis 190 in a direction opposite direction 390. Without departing from the scope hereof, temperature-robust polymer shroud 310 may be provided without outer diameter leg 316.

When journal 280 rotates relative to bearing cup 130, temperature-robust polymer shroud 310 and rotor 330 rotate with journal 280, while seal case 320 (together with elastomer lip 322 and insert 324) remains fixed to bearing cup 130, such that temperature-robust polymer shroud 310 and rotor 330 rotate relative to seal case 320 (and elastomer lip 322 and insert 324).

Roller bearing seal 110 provides three layers of sealing between roller bearing 100 and the outside environment: the labyrinth seal between insert 324 and rotor 330, the contact seal between elastomer lip 322 and wear ring 120, and a further protection (shrouding) of this contact seal provided by temperature-robust polymer shroud 310. Temperature-robust polymer shroud 310 may further serve to block or attenuate infrared radiation generated in the contact seal between elastomer lip 322 and wear ring 120 as the contact seal between elastomer lip 322 and wear ring 120 heats up during operation. Such infrared radiation is often used as the basis for detecting, for example by wayside infrared sensors, overheated roller bearings and taking such overheated roller bearings out of use.

Wear ring 120 is typically made of steel, or another material having a lower thermal expansion coefficient than the polymer of temperature-robust polymer shroud 310. Hence, wear ring 120 and temperature-robust polymer shroud 310 do not expand and contract in the same manner when subjected to temperature changes. As discussed in further detail below in reference to FIGS. 7, 8, and 9, temperature-robust polymer shroud 310 is, by virtue of the interference fitted inner diameter leg 312 and its oblique angle to radially outward facing surface 350, capable of maintaining contact with wear ring 120 across a wide temperature range even when the thermal expansion coefficient of wear ring 120 is lower than that of temperature-robust polymer shroud 310. Temperature-robust polymer shroud 310 is therefore capable of protecting (shrouding) the contact seal associated with elastomer lip 322 over a wide temperature range. In addition, due to the maintained contact over the wide temperature range, temperature-robust polymer shroud 310 prevents infrared light from escaping roller bearing 100 through gaps in the seal between wear ring 120 and temperature-robust polymer shroud 310. In the absence of this temperature-robustness, such infrared light could result in an erroneously high temperature reading by a wayside infrared sensor and force removal of the roller bearing from use. In one embodiment, temperature-robust polymer shroud 310 is capable of maintaining contact with radially outward facing surface 350 along a path that fully encircles rotation axis 190 in a temperature range spanning from −40 degrees Fahrenheit to 176 degrees Fahrenheit. These temperatures are reasonable limits for the operating range of a roller bearing, such as roller bearing 100, implemented in a rail car or a truck, for example.

In an embodiment, rotor 330 is composed of, or includes, fiber-reinforced polymer. In this embodiment, the difference in thermal expansion coefficient between rotor 330 and wear ring 120 is less than the difference in thermal expansion coefficient between temperature-robust polymer shroud 310 and wear ring 120. Hence, rotor 330 may remain properly seated on wear ring 120 over at least the temperature range associated with adequate coupling between temperature-robust polymer shroud 310 and wear ring 120.

Although FIG. 3 shows wear ring 120 being coupled to journal 280 via a ring 340, wear ring 120 may be mounted directly on journal 280 without departing from the scope hereof. Furthermore, it is understood that the apparent overlap conflict between wear ring 120 and each of inner diameter leg 312, elastomer lip 322 and rotor 330 is a machine-drawing artifact. The drawing shows the individual parts as they are to be manufactured but, in assembly, one or more of the parts flexes or is compressed to provide a tight fit.

In one embodiment, temperature-robust polymer shroud 310 forms a rib 318 protruding toward seal case 320 and encircling rotation axis 190. Although shown in FIG. 3 as touching seal case 320, rib 318 may be at a distance from seal case 320, without departing from the scope hereof. Without departing from the scope hereof, rib 318 may be implemented as a series of ribs each spaced apart from its neighboring ribs, wherein the series of ribs encircles rotation axis 190.

Figure 4:
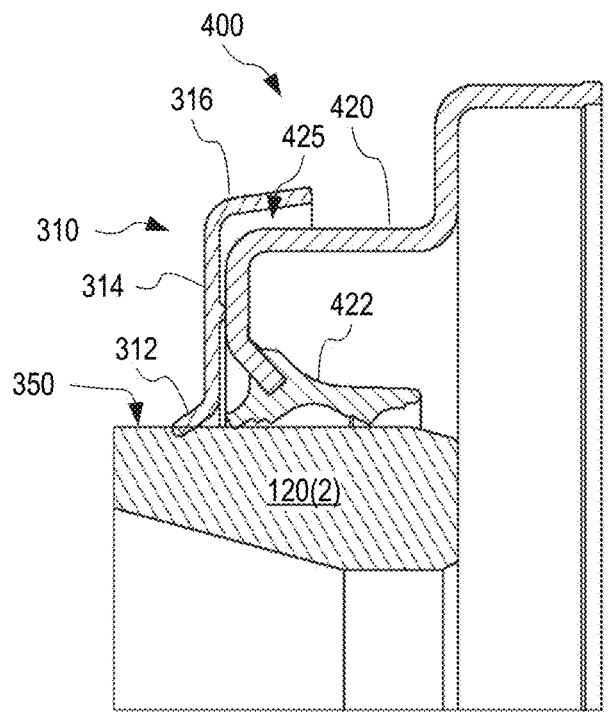
FIG. 4 illustrates another roller bearing seal with a temperature-robust polymer shroud, which is mounted on a wear ring, according to an embodiment.

FIG. 4 illustrates, in cross section, another roller bearing seal 400 with temperature-robust polymer shroud 310. FIG. 4 shows roller bearing seal 400 as mounted on wear ring 120(2). Temperature-robust roller bearing seal 400 may replace roller bearing seal 110 in the sealing of roller bearing 100 discussed above in reference to FIGS. 1, 2, and 3.

Roller bearing seal 400 includes temperature-robust polymer shroud 310, a seal case 420, and an elastomer lip 422. Seal case 420 is similar to seal case 320, but is not coupled with an insert 324. Elastomer lip 422 is similar to elastomer lip 322 except that elastomer lip 422, in the absence of insert 324 and rotor 330, may be larger than elastomer lip 322 to provide an increased area of contact, or two separate areas of contact, between elastomer lip 422 and wear ring 120. This increased contact may improve the sealing provided by the contact seal between elastomer lip 422 and wear ring 120, as compared to the sealing provided by the contact seal between elastomer lip 322 and wear ring 120 in roller bearing seal 110.

Figure 5:
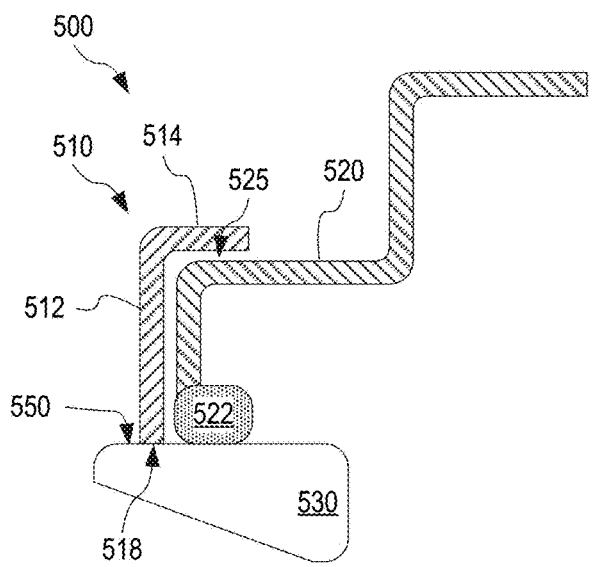
FIGS. 5 and 6 illustrate the temperature-dependent behavior of a simplified polymer shroud implemented in a roller bearing seal mounted on a steel wear ring, according to an embodiment.
Figure 6:
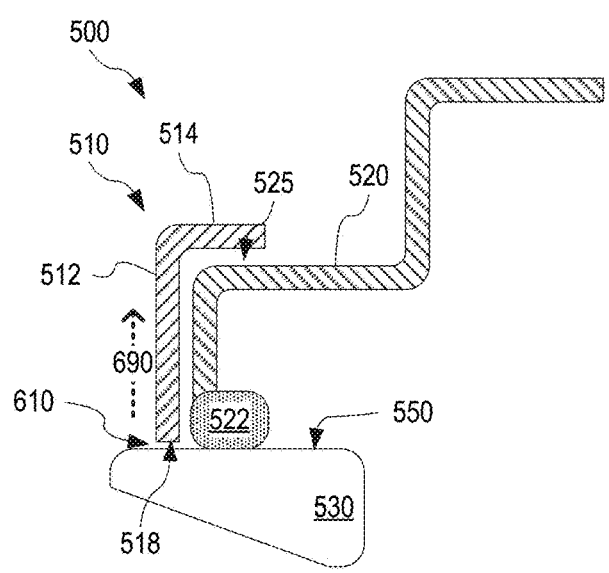

FIGS. 5 and 6 illustrate the temperature-dependent behavior of a simplified polymer shroud 510 implemented in a roller bearing seal 500 mounted on a steel wear ring 530. FIG. 5 shows the configuration of roller bearing seal 500 at a design temperature such as the temperature most commonly encountered during use of roller bearing seal 500, and FIG. 6 shows the configuration of roller bearing seal 500 at a temperature greater than the design temperature. FIGS. 5 and 6 are best viewed together in the following description.

Roller bearing seal 500 includes polymer shroud 510, a seal case 520, and an elastomer lip 522. Elastomer lip 522 seals seal case 520 to steel wear ring 530. Steel wear ring 530 may be similar to wear ring 120, seal case 520 may be similar to seal case 320 or seal case 420, and elastomer lip 522 may be similar to elastomer lip 322 or elastomer lip 422. Polymer shroud 510 includes a shroud body 512 and an outer diameter leg 514. Polymer shroud 510 wraps partially around anon-bearing side 525 of seal case 520. A radially inward facing surface 518 of shroud body 512 is mounted directly to a radially outward facing surface 550 of steel wear ring 530. The angle between shroud body 512 and steel wear ring 530 is approximately ninety degrees.

When the temperature is increased above the design temperature, polymer shroud 510 expands radially outward along a direction 690 away from rotation axis 190 (not shown in FIGS. 5 and 6). Since the rate of expansion of polymer shroud 510 is greater than the rate of expansion of steel wear ring 530, radially inward facing surface 518 of polymer shroud 510 loses contact with radially outward facing surface 550 of steel wear ring 530, allowing ingress of water and contaminants to the contact seal formed by elastomer lip 522. This increases the rate of wear of the interface between elastomer lip 522 and wear ring 530, potentially resulting in failure of roller bearing seal 500.

At temperatures significantly below the design temperature, the associated thermal contraction of polymer shroud 510 may cause polymer shroud 510 to break from the increased forces at the interface between radially inward facing surface 180 and radially outward facing surface 550 of the lesser-contracting steel wear ring 530.

Figure 7:
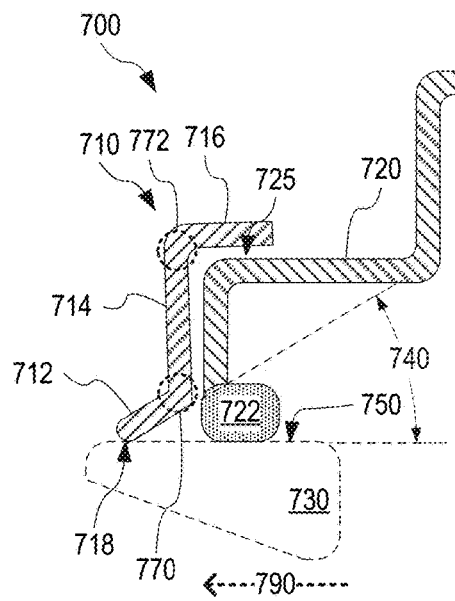
FIGS. 7, 8, and 9 show a roller bearing seal with a temperature-robust polymer shroud mounted on a wear ring, and illustrate responsiveness of the temperature-robust polymer shroud to temperature changes, according to an embodiment.
Figure 8:
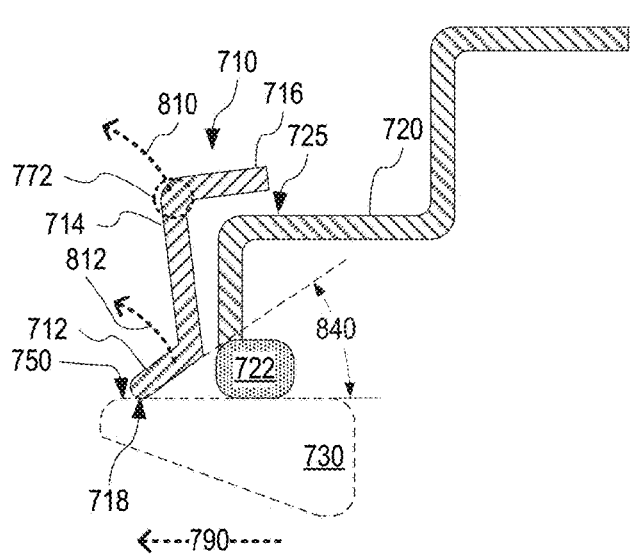
Figure 9:
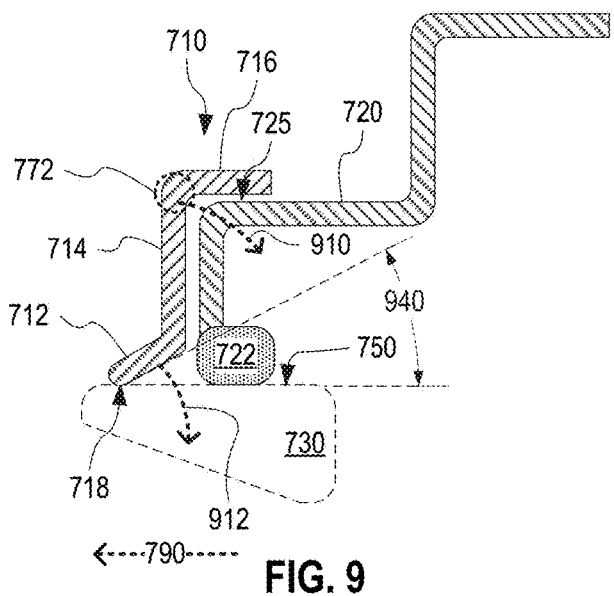

FIGS. 7, 8, and 9 illustrate a roller bearing seal 700 having a temperature-robust polymer shroud 710 mounted on a wear ring 730, and the response of temperature-robust polymer shroud 710 to temperature changes. FIGS. 7, 8, and 9 show roller bearing seal 700 in a cross section similar to that used in FIGS. 3 and 4. Roller bearing seals 110 and 400 are embodiments of roller bearing seal 700. A pair of roller bearing seals 700 may replace roller bearing seals 110 in the sealing of roller bearing 100. Generally, roller bearing seal 700 is configured for mounting on a wear ring, such as wear ring 730, to seal a roller bearing seal. FIGS. 7, 8, and 9 show the configuration of temperature-robust polymer shroud 710 at a central temperature, a temperature greater than the central temperature, and a temperature lower than the central temperature, respectively. FIGS. 7, 8, and 9 are best viewed together in the following description. The central temperature is, for example, room temperature or a temperature under which roller bearing seal 700 is assembled. Alternatively, the central temperature may be a temperature that is centered between the upper and lower temperature limits for proper operation of a roller bearing seal implementing temperature-robust roller bearing seal 700. The temperature associated with FIG. 8 is, for example, an operational temperature of roller bearing seal 700. The temperature associated with FIG. 9 is, for example, a temperature encountered when roller bearing seal 700 sits idle in a cold environment.

Roller bearing seal 700 includes temperature-robust polymer shroud 710, a seal case 720, and an elastomer lip 722 affixed to the inner diameter edge of seal case 720. Roller bearing seal 700 is configured to be mounted on a wear ring 730, for example on wear ring 120, in a manner similar to that discussed above for roller bearing seals 110 and 400. Elastomer lip 722 forms a contact seal between seal case 720 and a radially outward facing surface 750 of wear ring 730. Temperature-robust polymer shroud 710 is interference fitted onto radially outward facing surface 750 and wraps partially around a non-bearing side 725 of seal case 720 to protect (shroud) the contact seal formed by elastomer lip 722. In operation, temperature-robust polymer shroud 710 is stationary relative to wear ring 730, whereas seal case 720 together with elastomer lip 722 are free to rotate relative to wear ring 730.

Temperature-robust polymer shroud 710 is a single continuous part that is composed of a polymer, such as an engineering thermoplastic (such as polyester or a composite material), an ultraviolet-resistant polymer, a thermoset, or an ultraviolet-resistant engineering thermoplastic. Temperature-robust polymer shroud 710 includes an inner diameter leg 712 and a shroud body 714, each encircling rotation axis 190. Shroud body 714 extends predominantly in directions orthogonal to rotation axis 190 from an inner diameter 770 to an outer diameter 772. Inner diameter leg 712 connects to shroud body 714 at inner diameter 770, and is oriented at an oblique angle to rotation axis 190 and radially outward facing surface 750 to extend both (a) radially inward from inner diameter 770 and (b) axially away from inner diameter 770 along a direction 790 parallel to rotation axis 190. In the embodiment shown in FIGS. 7, 8, and 9, temperature-robust polymer shroud 710 further includes an outer diameter leg 716 that connects to outer diameter 772 of shroud body 714. Outer diameter leg 716 encircles rotation axis 190 and extends predominantly along rotation axis 190 in a direction opposite direction 790. Without departing from the scope hereof, temperature-robust polymer shroud 710 may be provided without outer diameter leg 716. Furthermore, seal case 720 may have shape differently from that shown in FIGS. 7, 8, and 9, without departing from the scope hereof. For example, seal case 720 may terminate near the second ninety-degree bend away from elastomer lip 722.

Wear ring 730 is composed of a material characterized by a lower thermal expansion coefficient than that of temperature-robust polymer shroud 710. In one embodiment, wear ring 730 is composed of steel.

At the central temperature (see FIG. 7), the radially innermost surface 718 of inner diameter leg 712 contacts radially outward facing surface 750, with the contact interface encircling rotation axis 190. Inner diameter leg 712 forms an angle 740 with radially outward facing surface 750 and rotation axis 190. Angle 740 is, for example, in the range from 20 to 50 degrees.

As shown in FIG. 8, when the temperature increases above the central temperature while wear ring 730 restricts temperature-robust polymer shroud 710 from radially inward expansion, the associated thermal expansion of temperature-robust polymer shroud 710 causes temperature-robust polymer shroud 710 to change shape and "roll" away from seal case 720, thereby increasing the angle between inner diameter leg 712 and wear ring to an angle 840 that is greater than angle 740. However, in contrast with the behavior of simplified polymer shroud 510 lacking an obliquely angled inner diameter leg interference fitted onto a wear ring, temperature-robust polymer shroud 710 does not lose contact with wear ring 730 when the temperature increases (at least up to a certain temperature). In one embodiment, temperature-robust polymer shroud 710 is configured to maintain contact with wear ring 730, along a path that encircles rotation axis 190, up to the upper extreme of a temperature range required by an industry standard specifying operating parameters for a roller bearing in a particular use setting, such as an industry standard for rail cars. More specifically, outer diameter 772 of shroud body 714 shifts in direction 790 and moves radially outward, as indicated by arrow 810. Concurrently, portions of inner diameter leg 712 away from contact with wear ring 730 also shift in direction 790 and move radially outward, as indicated by arrow 812. However, at least a portion of the radially innermost surface 718 of temperature-robust polymer shroud 710 remains in contact with radially outward facing surface 750 of wear ring 730. Hence, temperature-robust polymer shroud 710 is capable of protecting the contact seal formed by elastomer lip 722 at temperatures significantly above the central temperature.

As shown in FIG. 9, when the temperature decreases below the central temperature while wear ring 730 restricts temperature-robust polymer shroud 710 from radially inward expansion, the associated thermal contraction of temperature-robust polymer shroud 710 causes temperature-robust polymer shroud 710 to change shape, in a manner opposite that associated with a temperature increase, and "roll" toward seal case 720, thereby decreasing the angle between inner diameter leg 712 and wear ring to an angle 940 that is smaller than angle 740. The change of shape accommodates the forces from the lesser-contracting wear ring 730 and prevents the breakage of temperature-robust polymer shroud 710, which is characteristic of simplified polymer shroud 510. Hence, temperature-robust polymer shroud 710 is capable of protecting the contact seal formed by elastomer lip 722 at temperatures significantly below the central temperature. In one embodiment, temperature-robust polymer shroud 710 is configured to remain intact and maintain contact with wear ring 730, along a path that encircles rotation axis 190, down to the lower extreme of a temperature range required by an industry standard specifying operating parameters for a roller bearing in a particular use setting, such as an industry standard for rail cars. Furthermore, with the issue of cold-temperature induced breakage of the polymer shroud resolved by the shape change facilitated by the obliquely angle inner diameter leg 712, it is possible to form a tighter interference fit between temperature-robust polymer shroud 710 and wear ring 730. More specifically, outer diameter 772 of shroud body 714 shifts in a direction opposite direction 790 and also moves radially inward, as indicated by arrow 910. Concurrently, portions of inner diameter leg 712 away from contact with wear ring 730 also shift in a direction opposite direction 790 and move radially inward, as indicated by arrow 912. The radially innermost surface 718 of temperature-robust polymer shroud 710 (which may be a slightly different portion of temperature-robust polymer shroud 710 than at the temperatures associated with FIGS. 7 and 8) remains in contact with radially outward facing surface 750 of wear ring 730.

In one embodiment, temperature-robust polymer shroud 710 is capable of remaining both intact and in contact with wear ring 730 at all points along a path that encircles rotation axis 190 at least for all temperatures in the range from −40 degrees Fahrenheit to 176 degrees Fahrenheit. In another embodiment, temperature-robust polymer shroud 710 is capable of remaining both intact and in contact with wear ring 730 at all points along a path that encircles rotation axis 190 at least for all temperatures in the range from approximately −20 degrees Fahrenheit to 150 degrees Fahrenheit.

Although FIGS. 7, 8, and 9 show the contact between radially innermost surface 718 of inner diameter leg 712 and radially outward facing surface 750 of wear ring 730 as having only a point-type extent along rotation axis 190, it is understood that the actual contact interface is likely to be extended along some portion of rotation axis 190.

Figure 10:
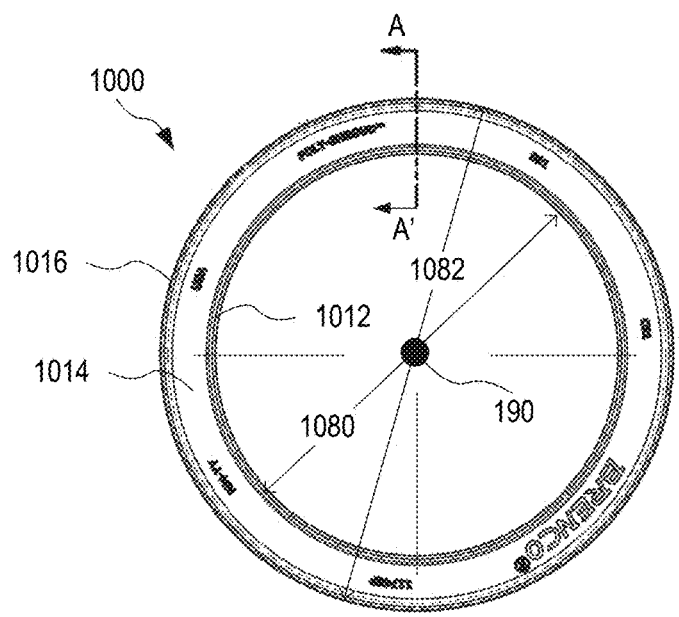
FIGS. 10 and 11 illustrate a temperature-robust polymer shroud for implementation in a roller bearing seal, according to an embodiment.
Figure 11:
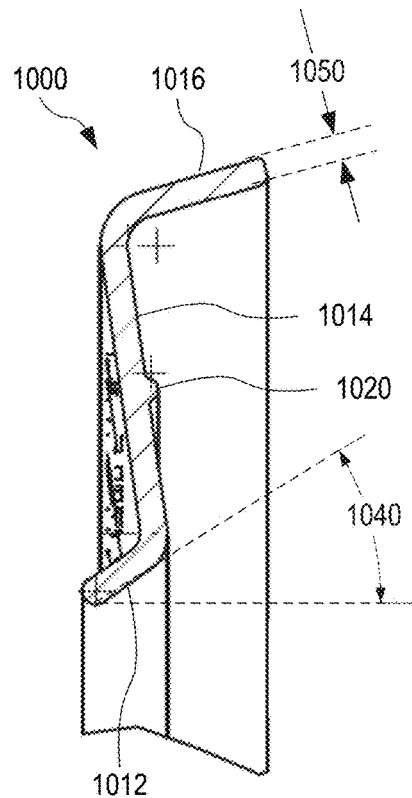

FIGS. 10 and 11 illustrate one temperature-robust polymer shroud 1000 for implementation in a roller bearing seal. Polymer shroud 1000 is an embodiment of temperature-robust polymer shroud 710. FIG. 10 shows temperature-robust polymer shroud 1000 as viewed along rotation axis 190, and FIG. 11 is a view of section A-A' indicated in FIG. 10. FIGS. 10 and 11 are best viewed together in the following description.

Temperature-robust polymer shroud 1000 includes a shroud body 1014, an inner diameter leg 1012, and an outer diameter leg 1016. Inner diameter leg 1012 is at an angle 1040 to rotation axis 190. Shroud body 1014 may form a rib 1020, such as rib 318, protruding in the same general direction as outer diameter leg 1016. Without departing from the scope hereof, rib 1020 may be implemented as a series of ribs each spaced apart from its neighboring ribs, wherein the series of ribs encircles rotation axis 190. At approximately room temperature and before mounting temperature-robust polymer shroud 1000 to a wear ring, angle 1040 may be in the range between 20 and 50 degrees, for example around 35 degrees, and shroud body 1014 is non-orthogonal to rotation axis 190. In one embodiment (a) the inner diameter 1080 of temperature-robust polymer shroud 1000 is in the range from 8 inches to 24 inches, for example around 14 inches, (b) the outer diameter 1082 of temperature-robust polymer shroud 1000 is in the range from 5 inches to 30 inches, for example around 9 inches, and (c) the thickness 1050 of temperature-robust polymer shroud 1000 is in the range from 0.02 inches to 0.1 inches, for example around 0.05 inches.

Figure 12:
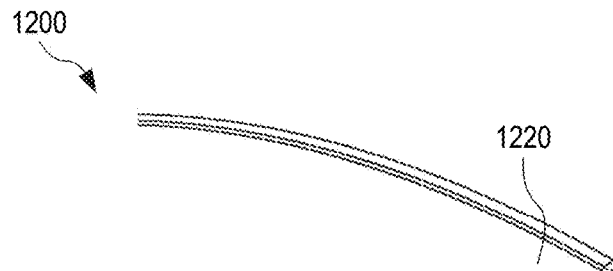
FIG. 12 illustrates a roller bearing seal implementing the temperature-robust polymer shroud of FIGS. 10 and 11, according to an embodiment.
Figure 12:
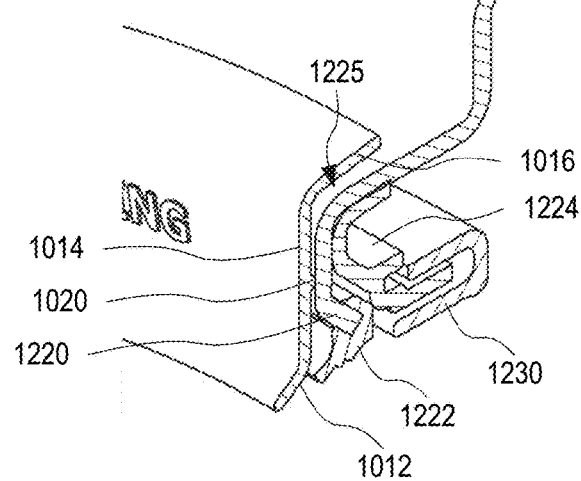

FIG. 12 shows a section of one roller bearing seal 1200 implementing temperature-robust polymer shroud 1000, in pictorial view. Roller bearing seal 1200 is similar to roller bearing seal 110. Roller bearing seal 1200 includes temperature-robust polymer shroud 1000, a seal case 1220, an elastomer lip 1222 affixed to the inner diameter of seal case 1220, an insert 1224 mounted in seal case 1220, and a rotor 1230. Seal case 1220, elastomer lip 1222, insert 1224, and rotor 1230 are similar to seal case 320, elastomer lip 322, insert 324, and rotor 330, respectively.

In an alternative embodiment, not shown in FIG. 12, bearing seal 1200 is provided without insert 1224 and without rotor 1230. In this embodiment, roller bearing seal 1200 is similar to roller bearing seal 400. In another alternative embodiment, also not shown in FIG. 12, insert 1224 is omitted and rotor 1230 is instead matched to a feature of seal case 1220 protruding in the direction toward the bearing to be sealed by roller bearing seal 1200.

Figure 13:
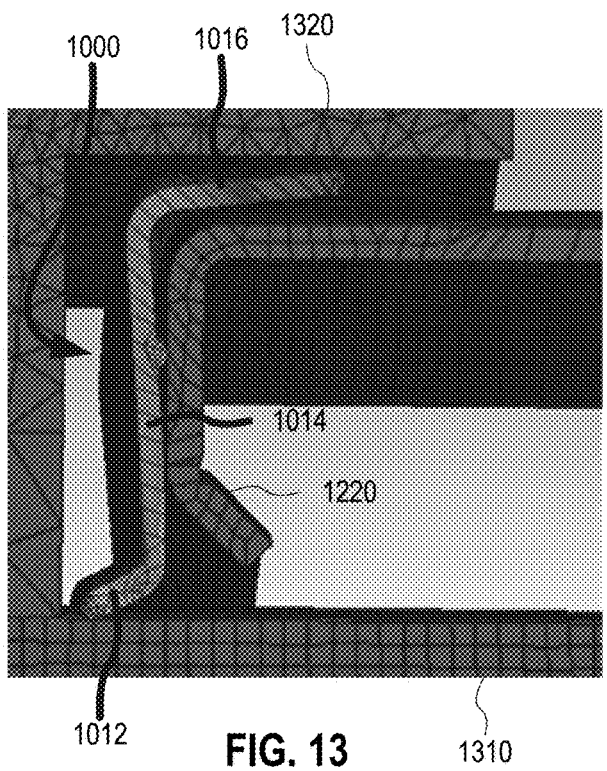
FIGS. 13, 14, and 15 illustrate shape change of one exemplary temperature-robust polymer shroud in response to temperature changes, in an embodiment.
Figure 14:
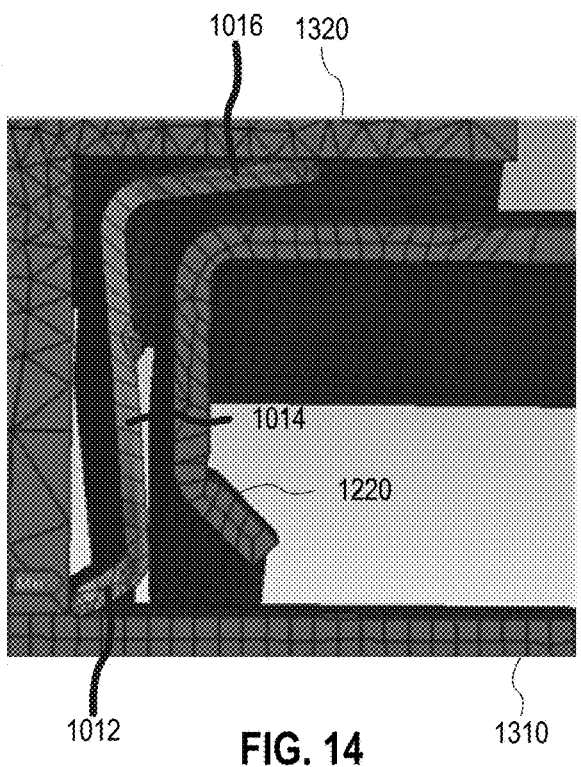
Figure 15:
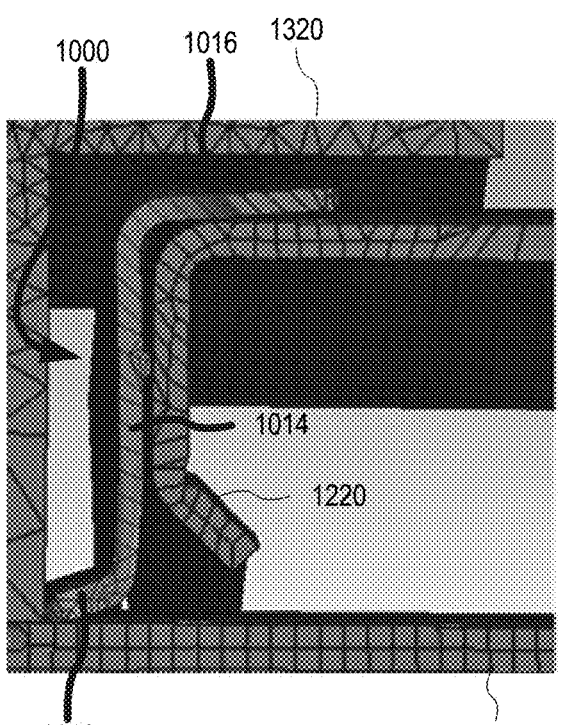

FIGS. 13, 14, and 15 are finite-element-analysis based stress plots simulating the shape and maximum principal stress of an example of temperature-robust polymer shroud 1000 when mounted on a wear ring 1310 (such as wear ring 120 or 730) between seal case 1220 and a retaining cap 1320 (similar to retaining cap 174). FIGS. 13, 14, and 15 show the shape of temperature-robust polymer shroud 1000 at 75 degrees Fahrenheit, 176 degrees Fahrenheit, and −40 degrees Fahrenheit, respectively. The plots of FIGS. 13, 14, and 15 show that temperature-robust polymer shroud 1000 responds to temperature as discussed for temperature-robust polymer shroud 710 above in reference to FIGS. 7, 8, and 9.

Figure 16:
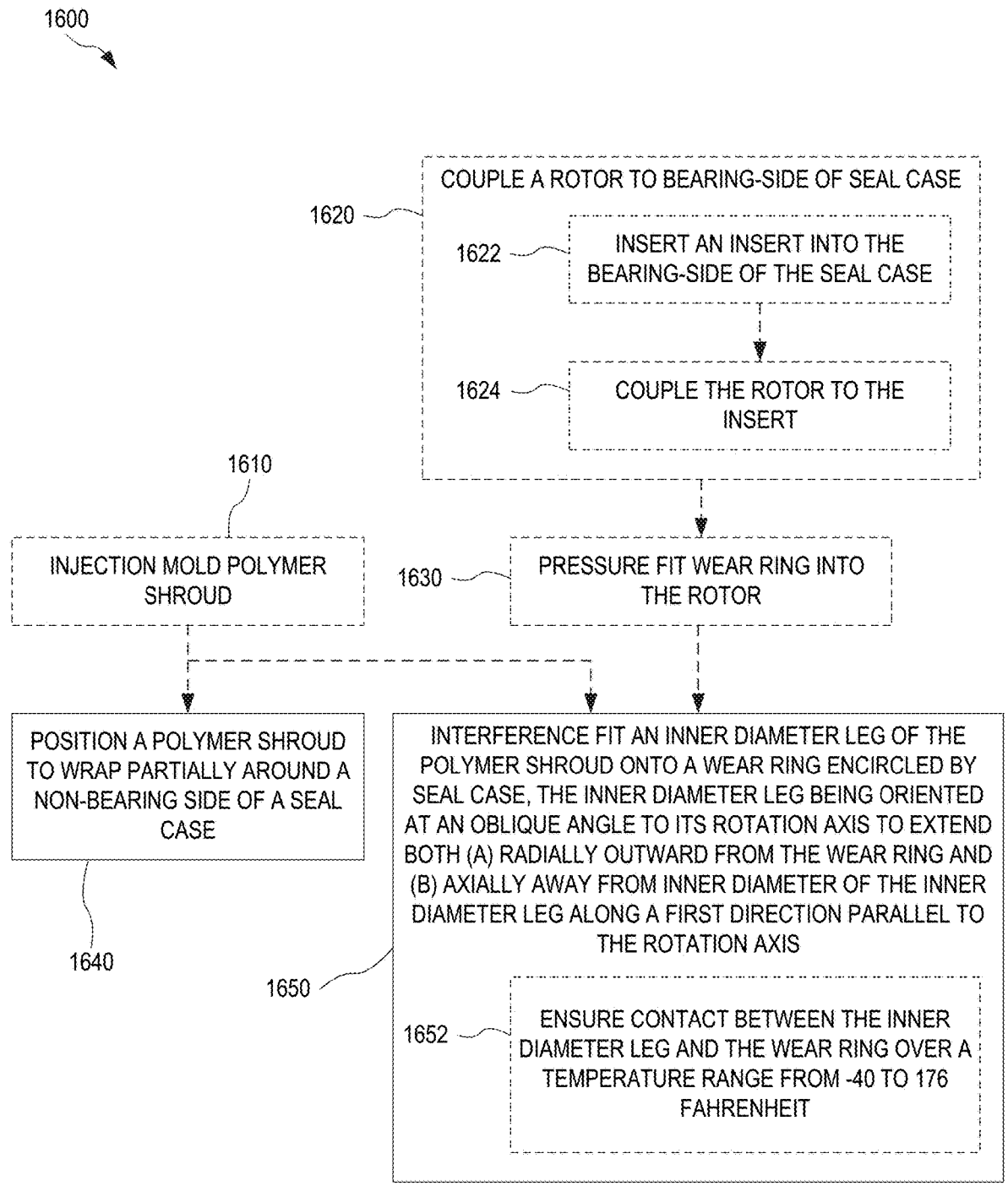
FIG. 16 illustrates a method for assembling a roller bearing seal having a temperature-robust polymer shroud, according to an embodiment.

FIG. 16 illustrates one method 1600 for assembling a roller bearing seal having a temperature-robust polymer shroud. Method 1600 may be used to assemble roller bearing seal 310, 400, 700, and 1200.

Method 1600 includes step 1640 and 1650, which may be performed concurrently. Step 1640 positions a temperature-robust polymer shroud to wrap partially around a non-bearing side of a seal case. In one example of step 1640, temperature-robust polymer shroud 710 is positioned to wrap partially around a non-bearing side 725 of seal case 720 mounted on wear ring 730. Step 1650 interference fits an inner diameter leg of the temperature-robust polymer shroud onto a wear ring encircled by the seal case. The inner diameter leg is oriented at an oblique angle to the rotation axis of the temperature-robust polymer shroud to extend both (a) radially outward from the wear ring and (b) axially away from the inner diameter of the inner diameter leg along a first direction parallel to the rotation axis. In one example, inner diameter leg 712 of temperature-robust polymer shroud 710 is interference fitted onto wear ring 730, such that radially innermost surface 718 of inner diameter leg 712 contacts radially outward facing surface 750 of wear ring 730.

Step 1650 may include a step 1652 of ensuring contact between the inner diameter leg and the wear ring, along a path encircling the rotation axis of the roller bearing seal, over a finite temperature range by virtue of the oblique angle of the inner diameter leg relative to the rotation axis. In one example, the oblique angle of inner diameter leg 712 of temperature-robust polymer shroud 710 ensures temperature-robust contact as discussed above in reference to FIGS. 7, 8, and 9.

In an embodiment, method 1600 further includes steps 1620 and 1630 preceding step 1650. Step 1620 couples a rotor to the bearing-side of a seal case in a manner that allows for rotation of the rotor relative to the seal case. In one example of step 1620, a rotor, such as rotor 1230, is coupled to a feature on the bearing-side of seal case 1220, as discussed above, while allowing for rotation of rotor 1230 relative to seal case 1220. Step 1620 may include steps 1622 and 1624. Step 1622 inserts an insert into the bearing-side of the seal case, and step 1624 couples the rotor to the insert in a manner that allows for rotation of rotor relative to the insert. In one example of steps 1622 and 1624, insert 1224 is inserted in the bearing-side of seal case 1220, and rotor 1230 is coupled to insert 1224, while allowing for rotation of rotor 1230 relative to insert 1224.

Optionally, method 1600 includes a step 1610 preceding step 1640. Step 1610 injection molds the temperature-robust polymer shroud. In one example of step 1610, temperature-robust polymer shroud 710 or 1000 is injection molded.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:
1. A roller bearing seal, comprising:
   a seal case;

an elastomer lip, attached to an inner diameter edge of the seal case, to complete a seal between the seal case and a wear ring while permitting rotation of the seal case and the elastomer lip about the wear ring; and a polymer shroud wrapping partially around a non-bearing side of the seal case and shrouding the seal, the polymer shroud including an inner diameter leg encircling a rotation axis of the roller bearing seal, the inner diameter leg being configured to attach the polymer shroud to the wear ring with the inner diameter leg being at an oblique angle to the wear ring along entire circumference of the wear ring.

2. The roller bearing seal of claim 1, the polymer shroud including a shroud body integrally connected to the inner diameter leg and extending radially outward from the inner diameter leg and along the seal case, the polymer shroud forming a bend between the inner diameter leg and the shroud body such that the inner diameter leg is bent away from the elastomer lip.

3. The roller bearing seal of claim 2, the polymer shroud being configured to, when mounted on the wear ring, change shape in response to temperature changes such that deviation from planarity of the shroud body increases with temperature.

4. The roller bearing seal of claim 1, the oblique angle being configured to ensure contact between the polymer shroud and the wear ring over a finite temperature range, the contact encircling the rotation axis.

5. The roller bearing seal of claim 4, the polymer shroud being configured to maintain the contact over a temperature range spanning at least from −40 degrees Fahrenheit to 176 degrees Fahrenheit.

6. The roller bearing seal of claim 1, when mounted to the wear ring the polymer shroud being configured to flex (a) radially outward and away from the seal case with increasing temperature and (b) radially inward and toward the seal case with decreasing temperature, while maintaining the contact.

7. The roller bearing seal of claim 1, further comprising:
an insert mounted on bearing-side of the seal case; and
a rotor configured to attach to the wear ring and form a labyrinth seal with the insert.

8. The roller-bearing seal of claim 1, the polymer shroud being configured to at least attenuate infrared radiation generated in a roller bearing sealed by the roller-bearing seal during operation of the roller bearing.

9. A roller bearing assembly, comprising:
a wear ring;
a roller bearing seal including:
  a seal case,
  an elastomer lip, attached to inner diameter edge of the seal case, to complete a seal between the seal case and a wear ring while permitting rotation of the seal case and the elastomer lip about the wear ring, and
  a polymer shroud wrapping partially around a non-bearing side of the seal case and shrouding the seal, the polymer shroud including an inner diameter leg encircling a rotation axis of the roller bearing seal, the inner diameter leg being configured to attach the polymer shroud to the wear ring with the inner diameter leg being at an oblique angle to the wear ring along entire circumference of the wear ring, the polymer shroud having higher thermal expansion coefficient than the wear ring; and a roller bearing sealed by the roller bearing seal.

10. The roller bearing assembly of claim 9, the wear ring being composed of steel.

11. The roller bearing assembly of claim 9, the polymer shroud further including a shroud body encircling the rotation axis of the polymer shroud and extending predominantly in directions orthogonal to the rotation axis from an inner diameter of the shroud body to an outer diameter of the shroud body, wherein, along the entire circumference of the wear ring, the inner diameter leg extends both (a) radially inward from the inner diameter of the shroud body and (b) axially away from the inner diameter of the shroud body along a first direction parallel to the rotation axis and away from the seal case.

12. The roller bearing assembly of claim 11, the polymer shroud further including an outer diameter leg that connects to the shroud body at the outer diameter of the shroud body, encircles the rotation axis, and extends predominantly along the rotation axis in a direction opposite the first direction.

13. A polymer shroud for a roller bearing seal, comprising:
a shroud body encircling a rotation axis of the polymer shroud and extending predominantly in directions orthogonal to the rotation axis from an inner diameter of the shroud body to an outer diameter of the shroud body; and
an inner diameter leg that connects to the shroud body at the inner diameter of the shroud body and encircles the rotation axis, wherein, along the entire inner diameter of the shroud body, the inner diameter leg is oriented at an oblique angle to the rotation axis to extend both (a) radially inward from the inner diameter of the shroud body and (b) axially away from the inner diameter of the shroud body along a first direction parallel to the rotation axis;
the shroud body and the inner diameter leg being respective portions of a single continuous part.

14. The polymer shroud of claim 13, further comprising an outer diameter leg that connects to the shroud body at the outer diameter of the shroud body, encircles the rotation axis, and extends predominantly along the rotation axis in a direction opposite the first direction.

15. The polymer shroud of claim 13, thermal expansion coefficient of the polymer shroud exceeding thermal expansion coefficient of steel.

16. The polymer shroud of claim 13, the shroud body being configured to change shape, wherein the outer diameter of the shroud body shifts in the first direction and moves radially outward when subjected to increasing temperature and when restricted from radially inward expansion.

17. The polymer shroud of claim 16, configured such that the outer diameter of the shroud body shifts opposite the first direction and moves radially inward when subjected to decreasing temperature decrease and when restricted from radially inward expansion.

\* \* \* \* \*